May 26, 1936. H. GOETZ Re. 19,981

SLOT AND SLUG FOR CHECK CONTROLLED APPARATUS

Original Filed May 25, 1932

Inventor:
Harry Goetz, deceased,
Yale Slot & Slug Company, Assignee,
By Brown, Jackson, Boettcher & Dienner
Attys.

Reissued May 26, 1936

Re. 19,981

UNITED STATES PATENT OFFICE 19,981

SLOT AND SLUG FOR CHECK CONTROLLED APPARATUS

Harry Goetz, deceased, late of Chicago, Ill., by Yale Slot & Slug Company, Chicago, Ill., assignee Original No. 1,929,740, dated October 10, 1933, Serial No. 613,379, May 25, 1932. Application for reissue January 13, 1934, Serial No. 706,533

11 Claims. (Cl. 194—4)

This invention relates to slots and slugs for check controlled apparatus, such as telephone sub-station instruments, and is concerned particularly with an attachment for converting the apparatus from a coin controlled device into a slug controlled device to thereby prevent surreptitious operation of the device with false tokens.

Many coin controlled devices, such as the coin collectors of telephone sub-stations, are provided with chutes protected by a housing which contains a circular pocket opening into the front face of the housing and through which a coin is inserted flat and brought into registration with the coin chute. This invention relates primarily to the conversion of a coin chute housing of this type into a slug receiving housing by an attachment which may be secured to the existing coin housing without mutilating that housing.

In its preferred form the invention consists of an attachment containing a guide adapted to lay against the front face of the coin chute housing and containing a pocket or pockets adapted to register with the circular coin receiving openings in the front of that housing. These pockets preferably have round bottoms, and register accurately with the coin receiving openings to guide slugs or tokens into the coin chute of the device.

A plate is located upon the top surface of the housing and guide, this plate containing a rectangular slot or slots which are guarded by projections arranged in accordance with the particular code that is to be used upon the slugs chosen for the installation. The guard and plate are held upon the housing by a metallic cap shaped to be fitted tightly thereover and containing ears which are depressed into existing indentations or openings in the housing to thereby securely fix the attachment on the housing. If desired, other corresponding attachment means such as rivets, or screws, might be provided. This preferred arrangement permits converting an existing coin controlled mechanism into a slug controlled mechanism without mutilating the coin controlled device in any manner that will destroy its original functions.

The invention is further advantageous in that it permits readily changing the code by which the coin slots are guarded, so that an entirely different set of slugs must be used to operate the device. This is accomplished by removing the cap of the attachment device and replacing the slotted plate with a similar plate which contains a slot or slots guarded in accordance with the new code. The slugs adapted to the old plate are replaced by slugs adapted to the new plate, and surreptitious operation of the device is prevented. This is also of advantage in that a large inventory of parts is not necessary to effect this conversion, since the plates themselves are the only members that are changed, and the remainder of the attachment assembly is unaltered. These plates are cheap and economical, and are easily replaceable in the assembly.

While the invention is of great utility in connection with coin controlled telephone sub-stations, and is described in connection with such devices, it is equally applicable to any coin controlled device to convert the same so as to compel customers to purchase a slug in order to operate the device.

This invention will be best understood by reference to the accompanying drawing, in which a preferred embodiment of it is shown by way of example, and in which:—

Figure 7:
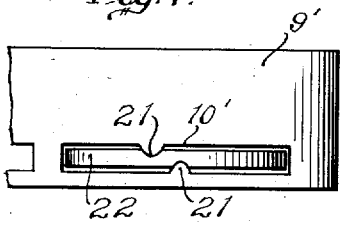
Figure 7 is a fragmentary plan view of a modified form of guard plate.
Figure 3:
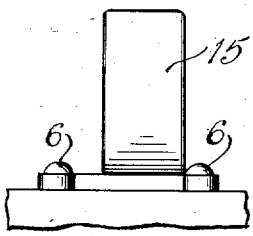
Figure 3 is an end view of the device shown in Figures 1 and 2.

Referring now to the drawing in more detail, there is shown a portion of a coin collector such as is commonly used in telephone pay stations, comprising a box or housing 1, containing coin chute 2, which communicates with a coin collector housing 3 located upon the top face of the box 1. As will be seen in Fig. 4, this coin collector housing contains three circular openings 5 leading inwardly from its front face and communicating with the coin chutes 2. The housing 3 is attached to the box 1 in any preferred manner such as by rivets 6.

Figure 5:
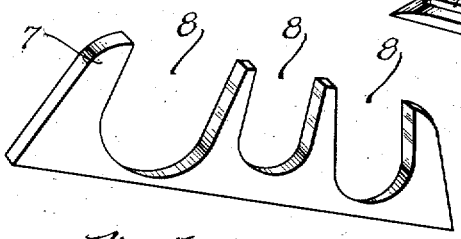
Figure 5 is a perspective view of the guide.

To convert a coin collector of this type into a slug or token collector, a guide 7 is placed over the front face of the housing 3. As will be seen in Figure 5 this guide contains pockets 8 which open into the top edge of the guide and are adapted to register with the coin receiving openings 5 in the collector. It is to be understood, however, that only a single pocket may be formed in the guide when only a single opening is to be protected. The outside configuration of the guide 7 conforms with the shape of the housing 3. The guide may conveniently be a die casting composed of an aluminum alloy or other suitable die casting material. The guide is preferably considerably thicker than the slugs which are to be used in the device.

Figure 6:
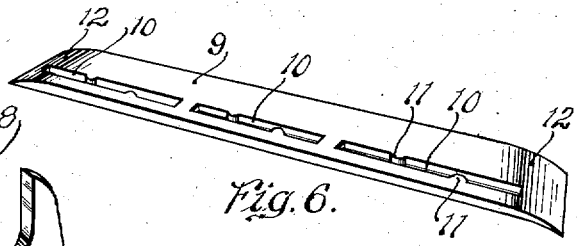
Figure 6 is a perspective view of the guard plate.

A slotted code plate 9 is placed across the top surfaces of the housing 3 and guide 7. This plate, shown in detail in Figure 6, is preferably composed of steel, which may be hardened, and contains a plurality of slots 10, one for each of the openings in the coin box. If only a single opening is to be protected, only a single slot for registry with the pocket for that opening will be provided. Ear-like code projections 11 extend into the slots 10 to adapt the slot for the reception of a grooved disc of particular dimension, and at the same time to prevent the insertion of discs or coins which are not grooved properly to register with these projections 11. Grooved discs of this kind are well known in the art, being disclosed in the Patent No. 1,115,661 issued to Henry Goetz, November 3, 1914. The ends of the plate 9 are tapered at 12 to more closely register the same with the outside surfaces of the coin housing.

Over the housing, guide and plate is placed a cap 15 which is preferably a single piece metallic cap shaped to accurately fit thereover. The cap may be composed of brass, plated to give it a neat appearance. The top surface of this cap is provided with a plurality of slots 16 spaced to register with the slots 10 in the plate 9. The lower edge of the housing 15 fits down accurately upon the flange-like portion of the housing 3, inside of the rivets 6 by which the housing is attached to the coin box.

Coin housings of the type shown are provided with circular openings 17 extending from the bottom portion of the coin receiving pockets 5 out through the back side of the housing. These openings are used to secure the cap 15 to the housing by ears 18 which are forced out of the back wall of the cap into the openings 17. The free ends of the ears 18 engage the periphery of these openings to securely lock the cap in place upon the housing. Locking the cap in place will lock the guide 7 and guard plate 9 upon the housing through the engagement of the walls of the cap with these members.

Figure 1:
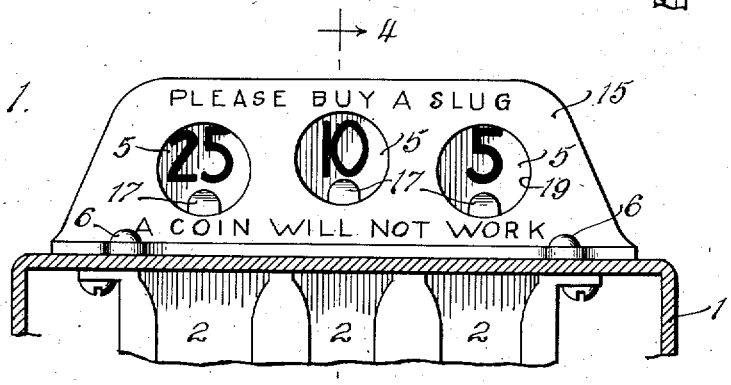
Figure 1 is a front elevational view of the device of this invention attached to a coin collector.

The front face of the cap 15 is perforated with circular openings 19 which coincide with the coin receiving opening 5 in the housing 3, but are of smaller diameter so that coins or tokens will not pass therethrough into the coin chutes. Frequently the back wall of the coin housing contains numbers indicating the coin that the particular opening is adapted to receive, and these numbers are visible through the perforations 19 in the cap. The front face of the cap preferably contains suitable directions stamped therein in the manner shown in Figure 1.

Figure 2:
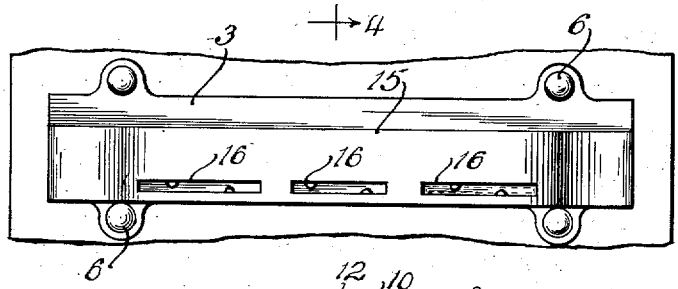
Figure 2 is a plan view of the device shown in Figure 1.

In the operation of the device a slug of the proper type is inserted in the slot 16 in the cap and turned therein until the grooves contained in it register with the projections 11, at which time the slug is free to pass through the slot into the pocket 8 in the guide 7. In Figure 2 is illustrated the manner of registering the slug with these projections.

Sometimes a slug dropped into the pockets 8, of its own accord will move through the opening 5 into the coin chute 2. Ordinarily it is pushed into the coin chute by inserting a finger through the opening 19 in the cap. Once in registration with the coin chute 2 the token drops into the mechanism contained in box 1 without further control.

As shown in Figures 2 and 6 the guard plate 9 is provided with three slots, all of which are guarded by projections 11. This embodiment is shown by way of example only. Frequently, in telephone sub-stations, it is desirable to have the slot indicated by the figure 5 in Figure 1 guarded to prevent the entrance of a five cent piece therein in order to compel the user of the substation to buy a slug for an ordinary telephone call. At the same time, slots designated by figures 10 and 25 in Figure 1 and adapted to receive dimes and quarters, respectively, may conveniently be unguarded to permit the entrance of coins therein. This is accomplished by omitting the indentations 11 from the slots in plate 9 which register with these latter two coin chutes. If desired, the same result may be accomplished by extending the guide member and plate only across the opening to be protected, and correspondingly terminating the cap member, so that only a portion of the housing 15 is enclosed thereby.

Telephone pay-stations are frequently operated by false slugs, with the result that considerable loss falls upon the storekeeper upon whose premises the pay-station is located, since the storekeeper must account to the telephone company for each token in the coin box. To minimize such losses it is desirable to frequently change the code of the slugs used in a particular pay-station, so that only the slugs sold over the counter will operate the device. This arrangement has been found to be effective. To this end a plurality of different plates 9 may be provided for insertion in the attachment of this invention. In Fig. 7 is shown a plate 9′ containing a rectangular slot 10′, in which the projections 21 extending into the slot 10′ are arranged differently from the projections 11 shown in the plate 9 in Fig. 6. A slug 22 having corresponding grooves is shown in the slot 10′.

In order to insert the plate 9′ in the attachment device, ears 18 are bent back out of engagement with the openings 17 by a blunt tool projected through openings 19 in the cap 15. Since the cap is preferably made of a relatively soft material, such as brass, the ears may be bent a number of times without breaking. With the cap thus loosened, it may be removed and the plate 9 is thus made accessible. The new plate 9′ is inserted, and the cap replaced and locked by reinsertion of ears 18 in the openings 17.

Figure 4:
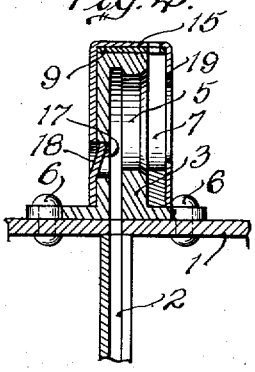
Figure 4 is a cross-sectional view taken along the line 4—4 of Figure 1, looking in the direction of the arrows.

Preferably, the upper slots 16 in the attachment casing or cap 15 are of substantially the same length and width as the lower coded slots 10 of the code plate 9, and of course lie in direct registration therewith, such relation being best shown in Figures 2 and 4. By virtue of this construction, the upper plain slots 16 serve as guide means for conveniently directing the slugs into the lower coded slots 10. For example, if on initial application of the slug the grooves in the faces of the slug are not in proper registration with the code projections 11 or 21 of the coded slot, there is avoided the attendant awkwardness and fumbling of the slug slipping forwardly or backwardly out of the plane of the coded slot in endeavoring to effect proper registration. This follows from the fact that the front and back walls of the upper plain slot 16 positively confine the slug against said forward or backward movement, so that the edge of the slug can be conveniently rotated to bring the grooves into registration with the code projections. This guiding function is of particular benefit where one or more of the code projections is at the center or near the center of the coded slot (as illustrated by the code projections 21 in Figure 7), since this relation makes it more difficult to start the introduction of the slug into the coded slot. A further advantage resides in having the code projections 11 formed on a separate plate which lies below the top wall of the attachment casing 15. This advantage is that the code projections 11 are thereby disposed at the bottoms of the upper slots 16 in the attachment casing. Being disposed in a plane below the top of the attachment casing, the code projections are made much more inaccessible to tampering. That is to say, it is more difficult to reach these code projections in attempting to mutilate them or to file them off. Attention is also directed to the fact that the attachment casing 15 has downwardly extending end walls 15*a* (Figure 2) and a downwardly extending back wall 15*b* which completely enclose the ends and back of the code plate 9 so that there is no possibility of one dislodging the code plate from the end or back of the attachment casing.

The attachment device of the present invention closely registers with the coin chute housing and therefore must be designed to fit the same. The specific details of construction herein described are shown by way of example only, and it is within the teachings of the invention to vary these details, thereby to adapt the device to other specific coin chute housings.

What is claimed is:—

1. In combination, a perforated coin receiving housing of the type into which coins are inserted flat and moved into engagement with coin chutes leading out of the housing, and attachment means for arranging the housing to receive grooved slugs moved edgewise through slots in the top of the attachment, said means being secured to the housing solely by a removable enclosing casing having ears registered with existing openings in said housing.

2. In combination, a perforated coin receiving housing of the type into which coins are inserted flat and moved into engagement with coin chutes leading out of the housing, and attachment means for arranging the housing to receive grooved slugs moved edgewise through slots in the top of the attachment, said means being encased in metallic cap held upon the housing by ears projected into existing openings in the housing.

3. In combination, a housing having a plurality of depressions in the front face thereof for the reception of slugs, a guide fitted over the front face of said housing and having pockets opening from the top thereof and registering with said depressions, a plate resting on the top edges of said housing and guide and containing guarded slots registering with said pockets, a cap fitted over said housing, guide and plate, and means on said cap engaging said housing for holding said assembly together.

4. In combination, a housing having a plurality of depressions in the front face thereof for the reception of slugs, a guide fitted over the front face of said housing and having pockets opening from the top thereof and registering with said depressions, a plate resting on the top edges of said housing and guide and containing slots guarded to pass a definitely formed slug but no other slug, a cap fitted over said housing, guide and plate and containing slots through which slugs may be passed to said plate and circular openings through which slugs may be digitally passed from said pockets into said depressions, and ears turned out of said cap into engagement with said housing for holding said assembly together.

5. The combination with a perforated coin housing of the type having circular coin receiving pockets recessed into the front face thereof and communicating with chutes leading into the mechanism upon which the housing is mounted, of a plate resting on the top of said housing and overhanging the front face thereof and containing guarded slots disposed in the overhanging portion of the same, a cap fitted over said housing and plate, ears turned out of the cap into the perforations in the housing to hold the cap and plate thereon, and means in the cap for guiding slugs dropped through said guarded slots through said pockets into said chutes.

6. An attachment for converting a coin receiving housing into a slug receiving housing comprising a slotted plate disposed outwardly of and on the upper edge of said housing, a guide member disposed on the side of said housing and below said plate, a removable enclosing casing separate from said plate and said guide member and fitting downwardly over said plate, guide member and housing for preventing unauthorized removal of said plate, and means for holding said attachment in position upon said housing.

7. The combination with a coin receiving housing having a chute in the rear portion of said housing and an aperture in the front of said housing communicating with said chute, of attachment means for converting said coin receiving housing into a slug receiving housing comprising an attachment casing comprising top, end and front walls partially embracing the top, end and front sides of said housing, a guide plate separate from said attachment casing interposed between the front wall of said casing and the front side of said housing, said guide plate including a U-shaped pocket having its lower portion lying in substantial registration with said aperture, a code plate separate from said attachment casing and capable of substitution independently thereof, said code plate being stationarily confined between the top wall of said attachment casing and the top side of said housing, said end wall of the attachment casing preventing access to the end edge of said code plate, said code plate comprising a front portion which extends beyond the front side of said housing and which has a slot therein disposed above the U-shaped pocket of said guide plate, a code projection extending from a side edge of said slot, a separate slot in the top wall of said attachment casing lying substantially over and in registration with the slot in said code plate, the separate, upper slot in the top wall of said attachment casing being of substantially the same width and length as the coded slot in said code plate, whereby said upper slot functions to guide the slugs to said coded slot and also restricts tampering access to the code projection in said coded slot, and an opening in the front wall of said attachment casing through which a finger can be inserted for pushing the slug back through said aperture and into said chute.

8. The combination with a coin receiving housing having a chute in the rear portion of said housing and an aperture in the front portion of said housing communicating with said chute, of attachment means for converting said coin receiving housing into a slug receiving housing comprising an attachment casing fitting down over said housing, said attachment casing comprising top and front walls partially embracing the top and front sides of said housing, the top wall of said attachment casing having a slot therein through which the slugs are adapted to be inserted, a code plate separate from said attachment casing stationarily confined between the top wall of said attachment casing and the upper portion of said housing, said code plate having a coded slot therein lying directly below and in registration with said upper slot in the top wall of said attachment casing, said coded slot including a code projection cooperating with said slot for preventing the insertion of unauthorized slugs through said slot, said upper slot in the top wall of the attachment casing being of substantially the same width and length as the coded slot in said code plate, whereby said upper slot functions to guide the slug to said coded slot and also restricts tampering access to the code projection in said coded slot, said code plate being capable of substitution independently of the substitution of said attachment casing in changing the coding of said slot, and guide means between the front wall of said attachment casing and the front side of said housing for receiving the slugs from said slot and positioning them in front of said aperture.

9. The combination with a coin receiving housing having a chute in the rear portion of said housing and an aperture in the front portion of said housing communicating with said chute, of attachment means for converting said coin receiving housing into a slug receiving housing comprising an attachment casing fitting over said housing, a slot in the upper portion of said attachment casing through which the slugs are adapted to be inserted, guide means for receiving the slugs from said slot and positioning them in front of said aperture, and code means separate from said attachment casing and interposed between said attachment casing and said housing, said code means including a code projection cooperating with said slot for preventing the insertion of unauthorized slugs through said slot, said code means being capable of substitution independently of substitution of said attachment casing in changing the coding of said slot, said upper portion of the attachment casing restricting tampering access to said code projection and the slot in said upper portion serving to guide the slugs to said code means.

10. The combination with a coin receiving housing having an aperture therein intended to receive coins, of a casing secured to said housing and having an opening therein for passing tokens to said aperture, and a code device enclosed within said casing and comprising code means cooperating with said opening for preventing the passage of coins or unauthorized slugs through said aperture, said code means being separate from said casing whereby said code means can be substituted independently of the substitution of said casing in changing the coding for different slugs, said casing restricting tampering access to said code means and the opening in said casing serving to guide the slugs to said code device.

11. In combination, a telephone pay station comprising a coin box, a coin receiving housing projecting upwardly from the top of said coin box, said coin receiving housing comprising a chute in the rear portion thereof discharging into said coin box and comprising an aperture in the front portion thereof through which coins can be passed rearwardly to said chute, attachment means for converting said coin receiving housing into a slug receiving housing comprising an attachment casing fitting down over the top and front of said housing, an upper slot in the top portion of said attachment casing, a separate code plate stationarily secured between said coin receiving housing and said attachment casing, said code plate having a coded slot therein lying in immediate juxtaposition below and in registration with the upper slot in said attachment casing, said coded slot having a code projection extending inwardly from one margin thereof, said attachment casing substantially enclosing said code plate to prevent unauthorized displacement of the latter, and said attachment casing restricting tampering with the code projection in said code slot, said code plate being interchangeable with another plate containing a coded slot to receive differently coded slugs without entailing the substitution of different attachment casings, means below said slots for receiving authorized slugs passed therethrough and positioning the same in front of said aperture, the front wall of said attachment casing having an opening therein through which a finger can be inserted for pushing the slugs back through said aperture and into said chute, and means for securing said attachment casing to said coin receiving housing.

YALE SLOT & SLUG COMPANY,
*Assignee of Harry Goetz, Deceased,*
By EMMA GOETZ,
*President.*